United States Patent
Han et al.

(10) Patent No.: US 12,427,836 B2
(45) Date of Patent: Sep. 30, 2025

(54) VEHICLE REFRIGERATOR CONTROL METHOD, STORAGE MEDIUM, AND VEHICLE

(71) Applicant: NIO TECHNOLOGY (ANHUI) CO., LTD, Hefei (CN)

(72) Inventors: Fang Han, Shanghai (CN); Wanli Shao, Shanghai (CN); Xiao Ding, Shanghai (CN); Chunhai Li, Shanghai (CN); Jiachen Zhang, Shanghai (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 292 days.

(21) Appl. No.: 18/184,716

(22) Filed: Mar. 16, 2023

(65) Prior Publication Data

US 2023/0294484 A1    Sep. 21, 2023

(30) Foreign Application Priority Data

Mar. 17, 2022   (CN) .......................... 202210267650.7

(51) Int. Cl.
   *B60H 1/32* (2006.01)
   *B60L 1/08* (2006.01)

(52) U.S. Cl.
   CPC .............. *B60H 1/3208* (2013.01); *B60L 1/08* (2013.01); *B60H 2001/3261* (2013.01); *B60H 2001/3266* (2013.01)

(58) Field of Classification Search
   CPC .......... B60H 1/3208; B60H 2001/3261; B60H 2001/3266; B60L 1/08
   See application file for complete search history.

(56) References Cited

U.S. PATENT DOCUMENTS

| | | | |
|---|---|---|---|
| 2003/0106332 A1 | 6/2003 | Okamoto et al. | |
| 2004/0006414 A1* | 1/2004 | Suzuki ................. | B60W 10/08 180/65.28 |

(Continued)

FOREIGN PATENT DOCUMENTS

| | | |
|---|---|---|
| CN | 101734248 | 6/2010 |
| CN | 107776455 | 3/2018 |

(Continued)

OTHER PUBLICATIONS

Official Action with English Translation for China Patent Application No. 202210267650.7, dated Oct. 25, 2023, 28 pages.

(Continued)

*Primary Examiner* — Hussein Elchanti
(74) *Attorney, Agent, or Firm* — Sheridan Ross P.C.

(57) ABSTRACT

The disclosure relates to the field of electric vehicles, and in particular provides a vehicle refrigerator control method, a storage medium, and a vehicle, aiming to solve the problems of how to implement the intelligent identification of items stored in a vehicle refrigerator, and of controlling the vehicle refrigerator based on information of the stored item and vehicle state information. To this end, the method of the disclosure includes: obtaining item information of a vehicle refrigerator; obtaining a real-time temperature and a target temperature of the vehicle refrigerator; obtaining vehicle state information; and controlling the vehicle refrigerator based on the real-time temperature, the target temperature, and the vehicle state information. By applying the method of the disclosure, the user can quickly and accurately know the information of the item stored in the vehicle refrigerator, a suitable target temperature can be automatically set based on the item information, and the vehicle refrigerator can be controlled, based on the vehicle state information, to operate in different modes. The method of the disclosure not only optimizes the control over the vehicle refrigerator, satisfies (Continued)

the refrigeration requirement, but also solves the problems of NVH and vehicle energy consumption, etc, thereby providing users with a more comfortable experience.

9 Claims, 8 Drawing Sheets

(56) References Cited

U.S. PATENT DOCUMENTS

| | | | | |
|---|---|---|---|---|
| 2004/0195017 | A1* | 10/2004 | Braun | B60K 6/547 |
| | | | | 180/65.25 |
| 2011/0246013 | A1* | 10/2011 | Yee | B60W 10/26 |
| | | | | 180/65.265 |
| 2018/0038633 | A1 | 2/2018 | Buttolo et al. | |
| 2019/0126772 | A1* | 5/2019 | Qiu | B60N 3/104 |
| 2020/0086730 | A1* | 3/2020 | Hara | B60P 1/431 |
| 2022/0113691 | A1* | 4/2022 | Kimpel | H04W 4/50 |

FOREIGN PATENT DOCUMENTS

| | | |
|---|---|---|
| CN | 108020017 | 5/2018 |
| CN | 110997405 | 4/2020 |
| CN | 111256426 | 6/2020 |
| CN | 112455302 | 3/2021 |
| CN | 113002300 | 6/2021 |
| CN | 113266975 | 8/2021 |

OTHER PUBLICATIONS

Official Action with English Translation for China Patent Application No. 202210267650.7, dated Jul. 24, 2024, 19 pages.
Search Report for European Patent Application No. 23161596.4, dated Aug. 21, 2023, 4 pages.
Official Action for European Patent Application No. 23161596.4, dated Sep. 1, 2023, 5 pages.

* cited by examiner

VEHICLE REFRIGERATOR CONTROL METHOD, STORAGE MEDIUM, AND VEHICLE

CROSS-REFERENCE TO RELATED APPLICATIONS

This application claims the benefit of China Patent Application No. 202210267650.7 filed Mar. 17, 2022, the entire contents of which are incorporated herein by reference in its entirety.

TECHNICAL FIELD

The disclosure relates to the field of electric vehicles, and in particular provides a vehicle refrigerator control method, a storage medium, and a vehicle.

BACKGROUND

As vehicle refrigerators begin to be accepted by more and more users, various vehicle manufacturers have launched vehicles with integrated vehicle refrigerators. However, most vehicle refrigerators still remain in the stage of basic refrigeration, and cannot identify items in a vehicle refrigerator to achieve intelligent storage management and reminders. When a user needs to check information (the type, quantity, shelf life, etc.) of the items in the refrigerator, he/she often needs to return to a vehicle, open the refrigerator and then confirm the items one by one. This method is time consuming and may also increase additional operations of the user, and if the user forgets to check an item or leaves an item out, there may sometimes be the case where the item expires beyond the shelf life thereof.

In addition, the vehicle refrigerators are used in a more demanding situation than household refrigerators, and also need to have noise, vibration and harshness (NVH) and energy consumption problems addressed while meeting the refrigeration requirement of refrigerators. During the operation of the refrigerator, noise and vibration will be generated, which will affect the comfort of passengers; and The energy consumption of the vehicle refrigerator affects the vehicle's endurance and battery charge level. Especially after the vehicle is powered off, the continuous operation of the vehicle refrigerator may cause the vehicle battery to drain and then make it impossible to start the vehicle again.

With the advancement of automobile intelligence technology, the vehicle refrigerator, as a part of an intelligent cockpit, has an increasing demand for an improvement in intelligence. During the use of the vehicle refrigerator, how to implement the intelligent identification of items stored in the vehicle refrigerator, reasonably setting a target temperature of the vehicle refrigerator based on the stored items, and optimizing the control over the vehicle refrigerator based on vehicle state information have become urgent problems to be solved.

Accordingly, there is a need for a new solution to solve the foregoing problem in the art.

BRIEF SUMMARY

The disclosure aims to solve or partly solve the foregoing technical problems, that is, of how to implement the intelligent identification of items stored in a vehicle refrigerator, and of controlling the vehicle refrigerator based on information of the stored item and the vehicle state information.

In a first aspect, the disclosure provides a vehicle refrigerator control method, the method including:
  obtaining a real-time temperature and a target temperature of a vehicle refrigerator;
  obtaining vehicle state information, the vehicle state information at least including a vehicle energy-saving setting; and
  controlling the vehicle refrigerator based on the real-time temperature, the target temperature, and the vehicle state information.

In an implementation of the foregoing vehicle refrigerator control method, "controlling the vehicle refrigerator based on the real-time temperature, the target temperature, and the vehicle state information" includes:
  determining whether the real-time temperature of the vehicle refrigerator is less than or equal to the target temperature;
  controlling the vehicle refrigerator to operate in a silent and low power mode when the real-time temperature thereof is less than or equal to the target temperature; and
  controlling the vehicle refrigerator based on the vehicle state information when the real-time temperature thereof is greater than the target temperature.

In an implementation of the foregoing vehicle refrigerator control method, the vehicle state information further includes at least one of a vehicle start state, a vehicle traveling state, an in-vehicle occupant status, and a vehicle battery charge level, and the method for "controlling the vehicle refrigerator based on the vehicle state information when the real-time temperature thereof is greater than the target temperature" includes:
  determining whether the vehicle energy-saving setting is a vehicle energy-saving mode;
  if so, controlling the vehicle refrigerator to operate in the silent and low power mode; and
  if not, controlling the operation of the vehicle refrigerator based on at least one of the vehicle start state, the vehicle traveling state, the in-vehicle occupant status, and the vehicle battery charge level.

In an implementation of the foregoing vehicle refrigerator control method, the method for "controlling the operation of the vehicle refrigerator based on at least one of the vehicle start state, the vehicle traveling state, the in-vehicle occupant status, and the vehicle battery charge level" includes:
  controlling the operation of the vehicle refrigerator based on the vehicle traveling state when the vehicle start state indicates started; and
  controlling the operation of the vehicle refrigerator based on at least one of the in-vehicle occupant status and the vehicle battery charge level when the vehicle start state indicates unstarted.

In an implementation of the foregoing vehicle refrigerator control method, the vehicle traveling state includes at least a vehicle traveling speed, and the method for "controlling the operation of the vehicle refrigerator based on the vehicle traveling state when the vehicle start state indicates started" includes:
  controlling the vehicle refrigerator to operate in a first refrigerating capacity mode when the vehicle traveling speed is less than a first speed threshold;
  controlling the vehicle refrigerator to operate in a second refrigerating capacity mode when the vehicle traveling speed is greater than or equal to the first speed threshold and less than a second speed threshold; and controlling the vehicle refrigerator to operate in a third refrigerating capacity mode when the vehicle traveling speed is greater than or equal to the second speed threshold, where refrigerating capacities respectively corresponding to the first refrigerating capacity mode, the second refrigerating capacity mode and the third refrigerating capacity mode increase sequentially.

In an implementation of the foregoing vehicle refrigerator control method, the method for "controlling the operation of the vehicle refrigerator based on at least one of the in-vehicle occupant status and the vehicle battery charge level when the vehicle start state indicates unstarted" includes:

controlling the vehicle refrigerator to operate in the silent and low power mode when the in-vehicle occupant status indicates that there is a person; and controlling the operation of the vehicle refrigerator based on the vehicle battery charge level when the in-vehicle occupant status indicates that there is no person, where, the method for "controlling the operation of the vehicle refrigerator based on the vehicle battery charge level" includes:

controlling the vehicle refrigerator to operate in a fourth refrigerating capacity mode when the vehicle battery charge level is greater than a first charge level threshold;

controlling the vehicle refrigerator to operate in the silent and low power mode when the vehicle battery charge level is less than or equal to the first charge level threshold; and controlling the vehicle refrigerator to stop operating after a preset period of time and/or to send a reminder message to a user when the vehicle battery charge level is less than a second charge level threshold, the reminder message including at least: a reminder to take out an item stored in the vehicle refrigerator and/or a reminder of an estimated showdown time of the vehicle refrigerator, where the first charge level threshold is greater than the second charge level threshold.

In an implementation of the foregoing vehicle refrigerator control method, the vehicle refrigerator is at least provided with a first key and a second key, and the method for obtaining the target temperature of the vehicle refrigerator includes:

obtaining a preset target temperature;

or, determining the target temperature based on item information of the item stored in the vehicle refrigerator, where the method for "determining the target temperature based on item information of the item stored in the vehicle refrigerator" includes:

obtaining historical item information of the vehicle refrigerator;

detecting key states of the first key and the second key in real time;

updating real-time item information of the vehicle refrigerator based on the key states of the first key and/or the second key and the historical item information; and determining the target temperature based on the real-time item information.

In an implementation of the foregoing vehicle refrigerator control method, the historical item information is stored in a cloud server, and the method for "updating real-time item information of the vehicle refrigerator based on the key states of the first key and/or the second key and the historical item information" includes:

obtaining information of an added item based on the first key;

when the information of the added item is contained in the historical item information, obtaining the information of the added item from the cloud server; and when the information of the added item is not contained in the historical item information, obtaining the information of the added item through the Internet.

In a second aspect, the disclosure provides a storage medium adapted to store a plurality of program codes, where the program codes are adapted to be loaded and run by a processor to perform a vehicle refrigerator control method according to any one of the foregoing solutions.

In a third aspect, the disclosure provides a vehicle including a vehicle body, a processor, and a memory, where the memory is adapted to store a plurality of program codes, and the program codes are adapted to be loaded and run by the processor to perform a vehicle refrigerator control method according to any one of the foregoing solutions.

With the foregoing technical solutions, a code scanning module of the disclosure performs intelligent control over the vehicle refrigerator based on the real-time temperature and the target temperature of the vehicle refrigerator and the vehicle state information. The method of the disclosure not only optimizes the control over the vehicle refrigerator, satisfies the refrigeration requirement, but also solves the problems of NVH and vehicle energy consumption, etc, thereby providing users with a more comfortable experience.

Further, in the disclosure, the code scanning module is triggered by operating the physical keys set on the vehicle refrigerator, to obtain the item information of the items stored in the vehicle refrigerator, and a suitable target temperature is then set based on the item information, so that the intelligent identification and intelligent storage management of the items in the refrigerator are achieved, thereby bringing a more convenient and intelligent experience to users. Moreover, the physical keys are more reliable and can better adapt to the demanding vehicle situation, thereby improving the reliability and stability of item identification.

BRIEF DESCRIPTION OF THE SEVERAL VIEWS OF THE DRAWINGS

Implementations of the disclosure are described below with reference to accompanying drawings, in which.

DETAILED DESCRIPTION

To make the objectives, technical solutions and advantages of embodiments of the disclosure clearer, the technical solutions in the embodiments of the disclosure will be clearly and completely described below with reference to the accompanying drawings. Apparently, the described embodiments are some of, rather than all of, the embodiments of the disclosure. Based on the embodiments of the disclosure, all other embodiments obtained by those of ordinary skill in the art without involving any inventive effort shall fall within the scope of protection of the disclosure.

Those skilled in the art should understand that these implementations are only used to explain the technical principles of the disclosure, and are not intended to limit the scope of protection of the disclosure. Those skilled in the art can make adjustments as required, so as to adapt to specific application scenarios. For example, although an electric vehicle is used as the application scenario in the embodiments of the disclosure, it is obvious that the method of the disclosure is also applicable to vehicles such as conventional fuel vehicles, hybrid vehicles, fuel cell electric vehicles and other new energy vehicles, provided that the vehicles are equipped with a vehicle refrigerator.

Figure 1:
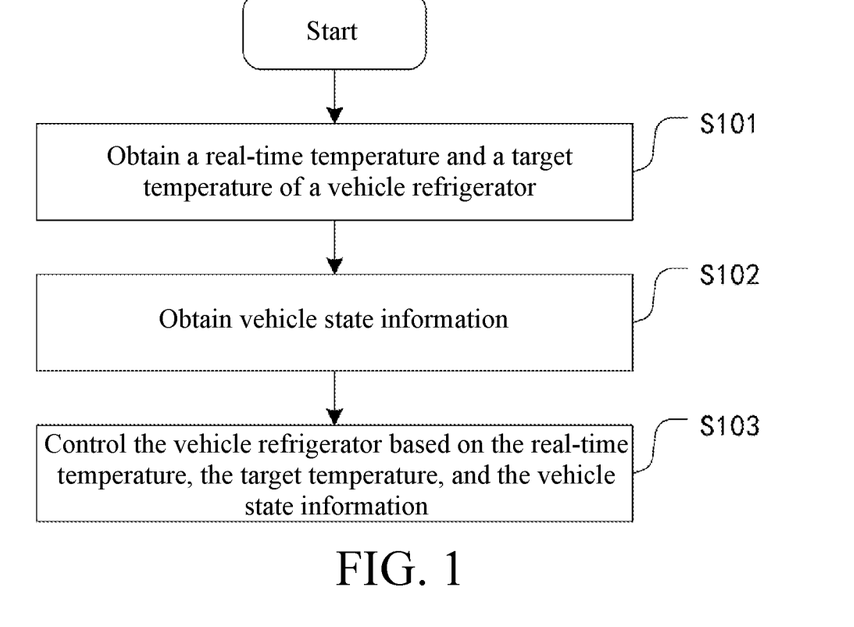
FIG. 1 is a flowchart of main steps of a vehicle refrigerator control method according to an embodiment of the disclosure.

First, referring to FIG. 1, FIG. 1 is a flowchart of main steps of a vehicle refrigerator control method according to an embodiment of the disclosure. As shown in FIG. 1, a vehicle refrigerator control method of the disclosure includes:

step S101: obtaining a real-time temperature and a target temperature of a vehicle refrigerator;

step S102: obtaining vehicle state information; and step S103: controlling the vehicle refrigerator based on the real-time temperature, the target temperature, and the vehicle state information.

Figure 2:
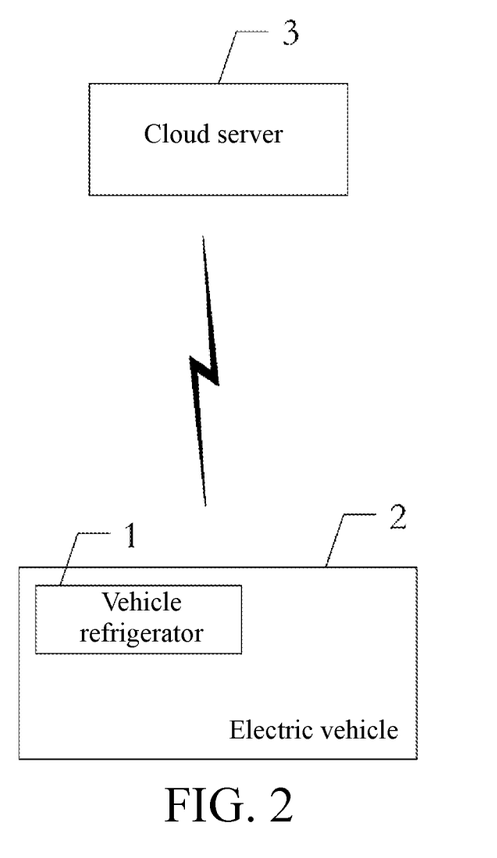
FIG. 2 is a schematic diagram of a vehicle refrigerator application system according to an embodiment of the disclosure.

In the vehicle refrigerator application system according to the embodiment of the disclosure as shown in FIG. 2, an electric vehicle 2 is equipped with a vehicle refrigerator 1, and the vehicle refrigerator 1 is connected to a vehicle control unit (VCU) of the electric vehicle 2 through a CAN bus, for data exchange; the VCU of the electric vehicle 2 is connected to a cloud server 3 through a public wireless communication network such as 4G/5G, and performs data exchange; and the cloud server 3 can perform data exchange with the vehicle refrigerator 1 through the public wireless communication network such as 4G/5G, and the VCU.

In step S101, a real-time temperature of a refrigerator and/or a freezer of the vehicle refrigerator 1 is obtained in real time or periodically by using a temperature sensor provided in the vehicle refrigerator 1, and the real-time temperature is uploaded to the VCU and/or the cloud server 3 according to settings.

In this embodiment, preferably, the method for obtaining the target temperature is determining the target temperature based on item information of items stored in the vehicle refrigerator, which will be described below in detail with reference to FIGS. 3 and 4.

Figure 3:
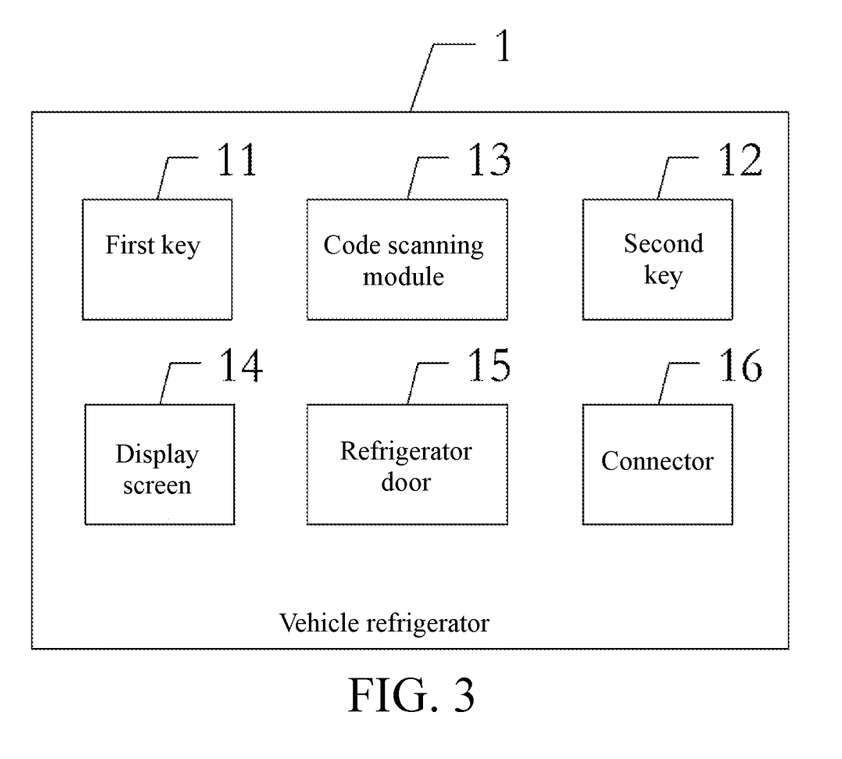
FIG. 3 is a schematic diagram of a compositional structure of a vehicle refrigerator according to an embodiment of the disclosure.
Figure 4:
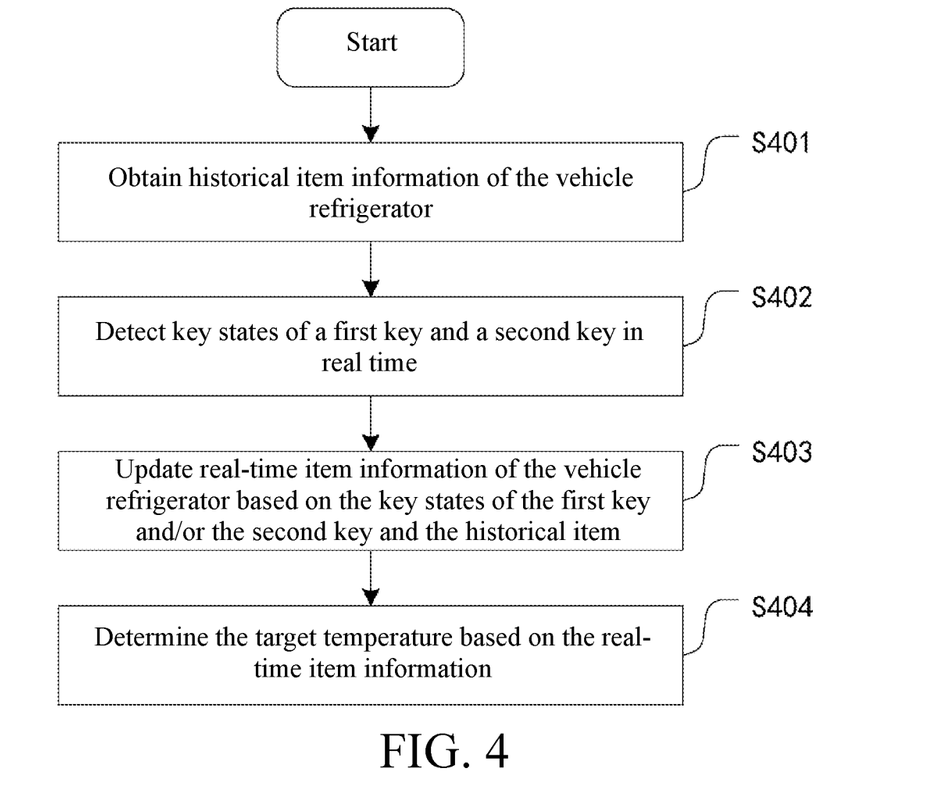
FIG. 4 is a flowchart of main steps of determining a target temperature based on item information of an item stored in a vehicle refrigerator according to an embodiment of the disclosure.

As shown in FIG. 3, the vehicle refrigerator 1 includes at least a first key 11, a second key 12, a code scanning module 13, a display screen 14, a refrigerator door 15, and a connector 16. Further, as shown in FIG. 4, the method for determining the target temperature based on item information of the item stored in the vehicle refrigerator specifically includes:

step S401: obtaining historical item information of the vehicle refrigerator;

step S402: detecting key states of a first key and a second key in real time;

step S403: updating real-time item information of the vehicle refrigerator based on the key states of the first key and/or the second key and the historical item information; and step S404: determining the target temperature based on the real-time item information.

In this embodiment, the item information includes the historical item information and the real-time item information, and is usually stored in the cloud server 3. The historical item information is historical data of information of all items that are once stored in the vehicle refrigerator 1; and the real-time item information is real-time information of items that are currently stored in the vehicle refrigerator 1. The data content of item information includes: an item code, an item name, an item production date and/or shelf life, an optimal storage temperature, etc. In step S401, when needed, the historical item information of the items stored in the vehicle refrigerator 1 can be obtained by querying from the cloud server 3.

Figure 5:
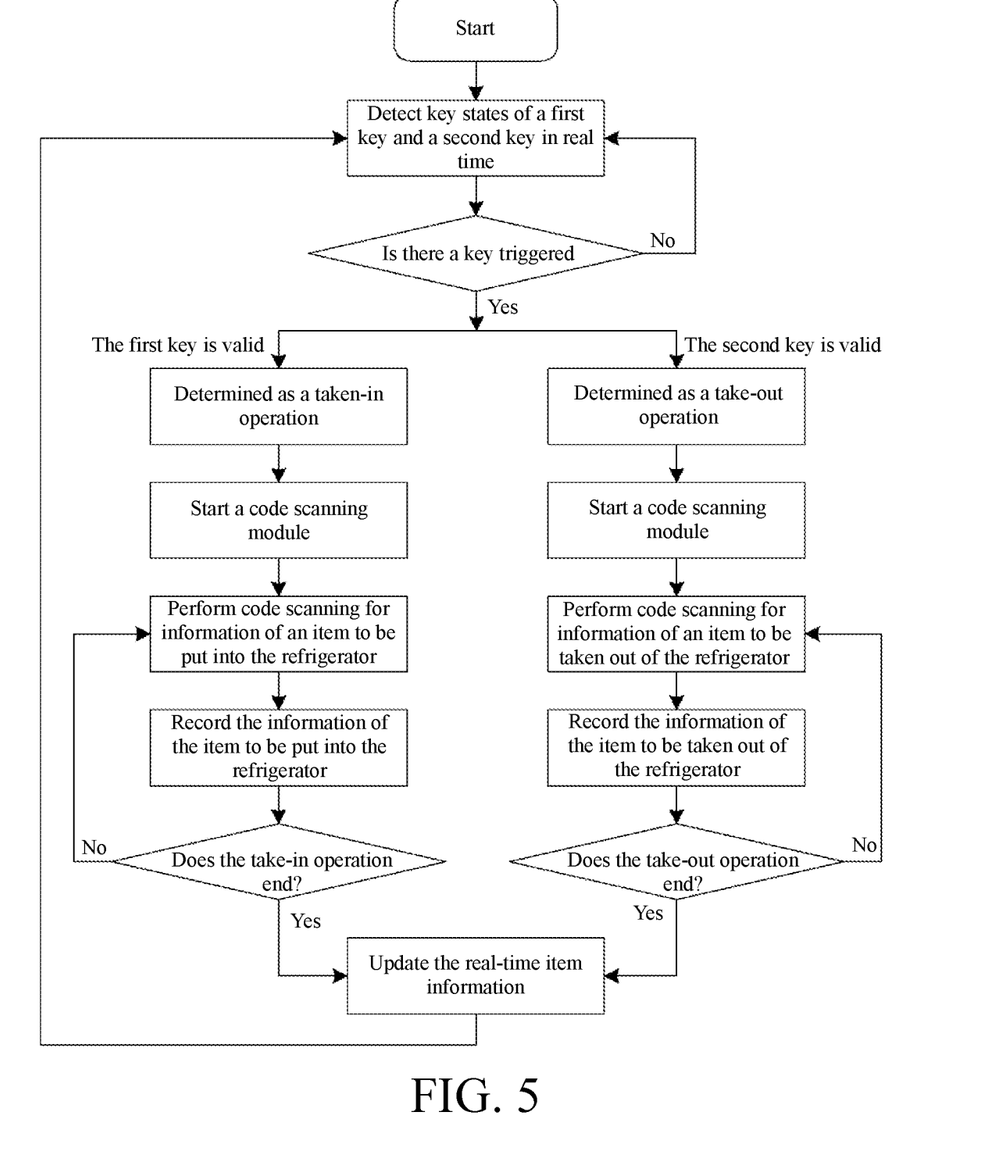
FIG. 5 is a flowchart of main steps of obtaining real-time item information according to an embodiment of the disclosure.

Further referring to FIG. 5, the method for obtaining the real-time item information in steps S402 and S403 is described in detail in conjunction with FIG. 5.

The VCU of the electric vehicle 2 checks, in real time, whether there is a key triggered, and determines, based on key states of a first key 11 and a second key 12 of the vehicle refrigerator 1, whether the first key 11 is valid or the second key 12 is valid. As an example, when the key is a self-reset key, the key can be set to be pressed down and held for more than a first duration (such as 0.5 seconds), and then released, which indicates a valid state.

When a user needs to put an item into the vehicle refrigerator, he/she first presses down the first key 11 and holds same for more than 0.5 seconds, and then releases the first key 11. When detecting that the first key 11 is valid, the VCU determines that the operation is an item put-in operation, and then starts the code scanning module 13 on the vehicle refrigerator 1. At this time, the user can place a one-dimensional barcode or two-dimensional code of the item to be put into the vehicle refrigerator 1 in an effective reading area of the code scanning module 13, so that the code scanning module 13 performs code scanning to obtain information of the item to be put into the refrigerator.

At the same time, the VCU detects, in real time, the presence of a condition for the end of the put-in operation. When no condition for the end of the put-in operation is present, the user can continuously perform code scanning operations, to obtain information of a plurality of items that all need to be put into the vehicle refrigerator 1. Preferably, a state of the refrigerator door 15 can be used as a determination condition for the end of the put-in operation. As an example, the process of identifying item put-in in combination with the refrigerator door 15 and the first key 11 is as follows:

Step one: opening the refrigerator door 15;
Step two: triggering the first key 11 to start the code scanning module 13;
Step three: performing code scanning on an item;
Step four: putting the item into the refrigerator; and
Step five: closing the refrigerator door 15.

With a plurality of items to be put in at one time, after the execution of the fourth step of putting the item into the refrigerator, the fifth step of closing the refrigerator door 15 is temporarily not performed, but the next item to be put into the vehicle refrigerator 1 is simply placed into the effective code-scanning area, and then continuous put-in operations are performed from step three.

In this embodiment, the code scanning module 13 is a laser code scanner. In another embodiment, the code scanning module 13 is an image code scanner.

In another embodiment, a put-in ending condition can be set such that if the code scanning module 13 has not read valid data for more than a second period of time (for example, 3 seconds), it is determined that the put-in operation is ended.

Similarly, when a user needs to take an item out of the vehicle refrigerator 1, he/she first presses down the second key 12 and holds same for more than 0.5 seconds, and then releases the second key 12. When detecting that the second key 12 is valid, the VCU determines that the operation is an item take-out operation, and then starts the code scanning module 13 on the vehicle refrigerator 1. At this time, when taking the item out of the vehicle refrigerator 1, the user needs to place a one-dimensional barcode or two-dimensional code of the item in the effective reading area of the code scanning module 13, so that the code scanning module 13 performs code scanning to obtain information of the item to be taken out of the refrigerator.

At the same time, the VCU detects, in real time, the presence of a condition for the end of the take-out operation. When no condition for the end of the take-out operation is present, the user can continuously perform code scanning operations on the items to be taken out of the refrigerator, to obtain information of a plurality of items that all need to be taken out of the vehicle refrigerator 1. Preferably, a state of the refrigerator door 15 can be used as a determination condition for the end of the take-out operation. As an example, the process of identifying item take-out in combination with the refrigerator door 15 and the second key 12 is as follows:

Step one: opening the refrigerator door 15;
Step two: triggering the second key 12 to start the code scanning module 13;
Step three: taking out an item;
Step four: performing code scanning on the item; and
Step five: closing the refrigerator door 15.

With a plurality of items to be taken out at one time, after the execution of the fourth step of performing code scanning on the item, the fifth step of closing the refrigerator door 15 is temporarily not performed, but subsequent items are simply taken out and subjected to code scanning, and then continuous take-out operations are performed from step three.

It should be noted that the user may also complete the put-in operation and the take-out operation at one time. As an example, the user first triggers the first key 11, so that a system performs the put-in operation; and after the user further triggers the second key 12, the system automatically ends the process of the put-in operation, and then executes the process of the take-out operation.

In this embodiment, the item information obtained directly by scanning the code of the vehicle refrigerator 1 includes at least the item code. Moreover, when the one-dimensional barcode and/or the two-dimensional code on the item is a customized special code, the special code can contain more information, for example, an item name, an item production date and/or shelf life, an optimal storage temperature, etc.

Figure 6:
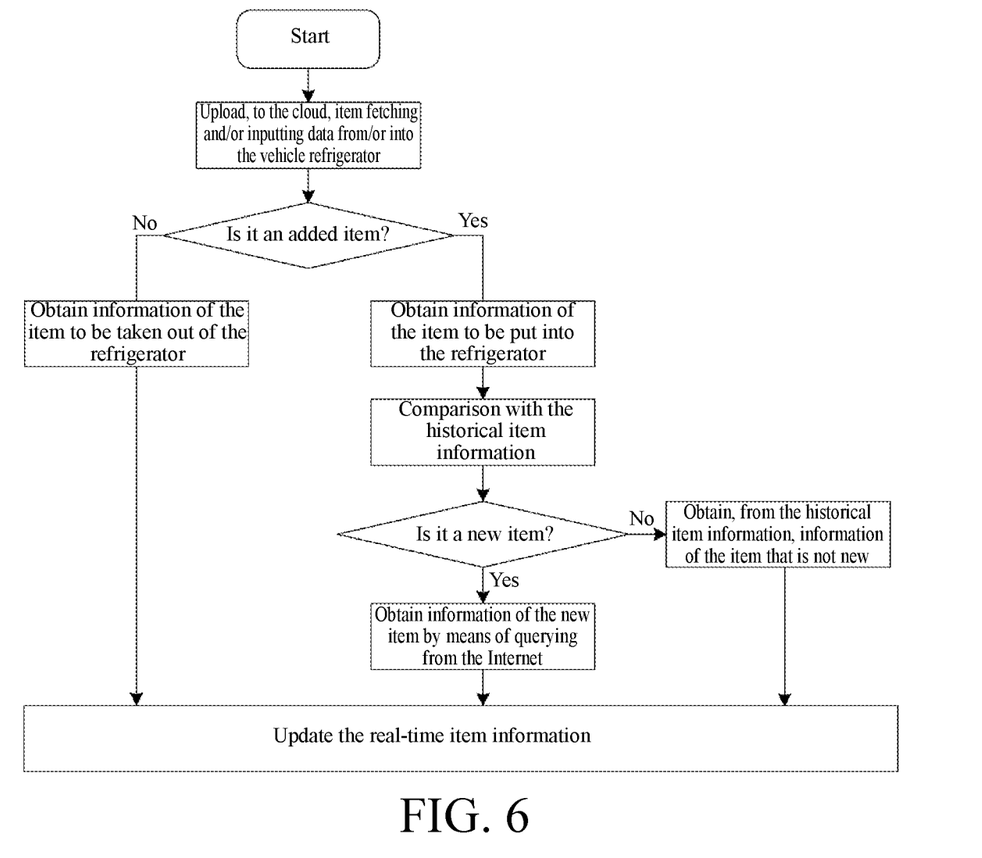
FIG. 6 is a flowchart of main steps of updating real-time item information based on key states of a first key and/or a second key and historical item information according to an embodiment of the disclosure.

After the user completes the put-in operation and/or the take-out operation of a product by using the first key 11 and/or the second key 12, the steps of the method for updating real-time item information of the vehicle refrigerator 1 based on the key states of the first key 11 and/or the second key 12 and the historical item information are as shown in FIG. 6.

The electric vehicle 2 uploads, to the cloud server 3, item fetching and/or inputting data of the vehicle refrigerator 1. At the cloud server 3, it is determined, based on the key states of the first key 11 and/or the second key 12 that are contained in the data, whether the uploaded item includes an added item.

When the uploaded data is the item fetching data (the data contains the state of the second key 12), based on an item code in information of items to be taken out of the refrigerator, the information of the item is found from real-time information of items that are currently stored in the vehicle refrigerator 1, and is then deleted, so that the real-time item information is updated.

When the uploaded data is the item inputting data (the data contains the state of the first key 11), the item is an added item, and there is a need to further determine whether the added item is a new item.

The item code of the added item is compared with all the item codes in the historical item information stored in the cloud server 3. If there is a same item code, this indicates that the added item is not a new item, and other item information (such as an item name, an item production date and/or shelf life, an optimal storage temperature, etc.) of the added item is directly obtained from the historical item information stored in the cloud server 3.

If the item code of the added item is not contained in the historical item information, the added item is a new item, and other item information of the new item can be obtained by means of querying from the Internet of Things based on the item code information, and the information of the new item is added to the historical item information, so that the historical item information in the cloud server 3 is constantly updated.

It should be noted that, preferably, the first key 11 and the second key 12 are physical keys. The physical keys are selected to assist with code scanning to obtain the information of the item stored in the vehicle refrigerator 1 because the physical keys are more reliable and can better adapt to the demanding vehicle situation, thereby improving the reliability and stability of item identification.

In this embodiment, the vehicle refrigerator 1 is also equipped with an indicator light and/or a display screen 14, which reminds the user of the current operation content and operation state during the item put-in and take-out operations, thereby making the item identification process more reliable while improving the user experience.

It should be noted that the vehicle refrigerator 1 is also equipped with a communication module, such as a CAN communication module in this embodiment. The control module (a main processor) of the vehicle refrigerator 1 performs data exchange with the VCU of the electric vehicle 2 through a communication interface of the connector 16.

It should be noted that the cloud server 3 can be set to periodically send the information of the item currently stored in the vehicle refrigerator 1 to the user through the vehicle display screen, the user's smart phone, etc., so that the user can know the item in the vehicle refrigerator 1 in a timely manner. The cloud server can also be set to send, to the user, expiration reminder information regarding an item that is about to expire, prompting the user to use same in a timely manner.

Further, in step S404, the cloud server 3 performs autonomous learning and calculation based on the storage temperature information in the real-time item information, and integrates optimal storage temperatures of all items, to obtain the target temperature of the vehicle refrigerator 1. As an example, an average value of the optimal storage temperatures of all the items can be selected as the target temperature, or the optimal storage temperature with the minimum value can be selected as the target temperature. Those skilled in the art can design the method for obtaining the target temperature according to actual conditions.

In another embodiment, the method for obtaining the target temperature of the vehicle refrigerator 1 is that the user directly sets the target temperature through a smart terminal. As an example, the target temperature is manually preset through a dedicated APP on a smart phone, and is then uploaded to the cloud server 3.

Figure 7:
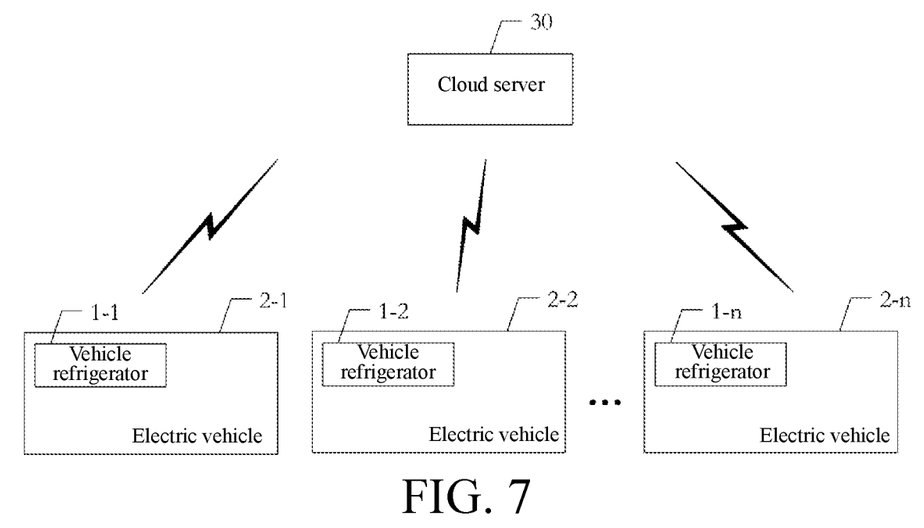
FIG. 7 is a schematic diagram of a vehicle refrigerator application system according to another embodiment of the disclosure.

Preferably, in the schematic diagram of another vehicle refrigerator application system as shown in FIG. 7, a cloud server 30 is designed to connect and manage a plurality of electric vehicles and vehicle refrigerators through a public wireless communication network such as 4G/5G. Information of items stored in all vehicle refrigerators of the system, such as a vehicle refrigerator 1-1 of an electric vehicle 2-1, a vehicle refrigerator 1-2 of an electric vehicle 2-2, and a vehicle refrigerator 1-n of an electric vehicle 2-n, is uploaded and summarized to the cloud server 30, and the cloud server 30 iteratively updates the data stored in the server with the new item information, Internet data, etc., thereby forming the big data of the historical item information of the vehicle refrigerator.

Further, in step S102, similarly, the VCU of the electric vehicle 2 can obtain vehicle state information, where the vehicle state information includes: a vehicle energy-saving setting, a vehicle start state, a vehicle traveling state, an in-vehicle occupant status, a vehicle battery charge level, etc.

In step S103, the operation of the vehicle refrigerator 1 is controlled based on the real-time temperature of the vehicle refrigerator 1, the target temperature of the vehicle refrigerator 1 and the vehicle state information, which are already obtained.

In this embodiment, the real-time temperature of the vehicle refrigerator 1 is preferentially compared with the target temperature thereof, and when the real-time temperature is less than or equal to the target temperature, the vehicle energy saving and NVH need to be considered while maintaining the real-time temperature of the vehicle refrigerator 1 not greater than the target temperature thereof. Therefore, preferably, the vehicle refrigerator 1 is controlled to operate in the silent and low power mode.

When the real-time temperature is greater than the target temperature, the vehicle refrigerator 1 is controlled based on the vehicle state information. Further referring to FIG. 8, the method for controlling the vehicle refrigerator 1 based on the vehicle state information is described in detail with reference to FIG. 8.

Figure 8:
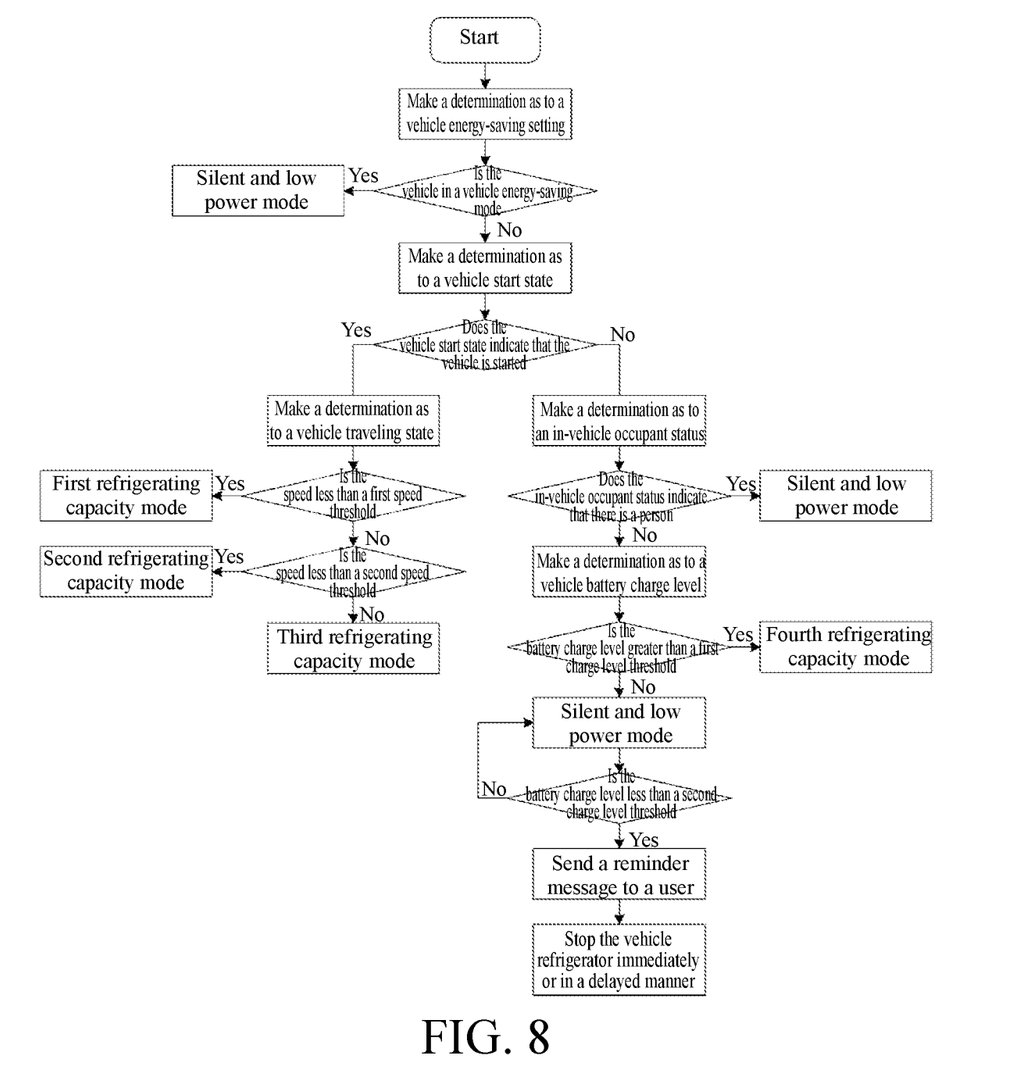
FIG. 8 is a flowchart of main steps of controlling a vehicle refrigerator based on vehicle state information according to an embodiment of the disclosure.

First, it is determined whether the vehicle energy-saving setting is a vehicle energy-saving mode. When the electric vehicle 2 is set to be in the vehicle energy-saving mode, energy-saving is prioritized, and in this case, the vehicle refrigerator 1 is controlled to operate in the silent and low power mode. When the electric vehicle 2 is not set to the vehicle energy-saving mode, a further determination is made regarding other information in the vehicle state information, such as a vehicle start state, a vehicle traveling state, an in-vehicle occupant status, a vehicle battery charge level, etc., and the operation of the vehicle refrigerator 1 is controlled based on at least one of same.

A further determination as to the vehicle start state is made. When the electric vehicle 2 has started, the operation of the vehicle refrigerator 1 is controlled based on the vehicle traveling state; and when the electric vehicle 2 is not started, the operation of the vehicle refrigerator 1 is controlled based on at least one type of information of the in-vehicle occupant status and the vehicle battery charge level.

Specifically, when the electric vehicle 2 has started, the vehicle refrigerator 1 enters an intelligent NVH operating mode, that is, different refrigerating capacity modes are controlled based on vehicle traveling speeds in different gears, to meet NVH requirements in vehicle-specific application environment. The vehicle refrigerator 1 is controlled to operate in a first refrigerating capacity mode when the vehicle traveling speed is less than a first speed threshold; the vehicle refrigerator is controlled to operate in a second refrigerating capacity mode when the vehicle traveling speed is greater than or equal to the first speed threshold and less than a second speed threshold; and the vehicle refrigerator is controlled to operate in a third refrigerating capacity mode when the vehicle traveling speed is greater than or equal to the second speed threshold. In addition, refrigerating capacities respectively corresponding to the first refrigerating capacity mode, the second refrigerating capacity mode and the third refrigerating capacity mode increase sequentially.

It can be seen from above that the first speed threshold is less than the second speed threshold. In other words, the output power and noise of a vehicle usually increase with the increase of the vehicle speed, and in this case, the noise generated when the vehicle refrigerator 1 operates may have a reduced impact with respect to the vehicle noise. Therefore, as the vehicle speed increases, the refrigerating capacity of the vehicle refrigerator 1 can be increased, to further ensure the refrigerating effect of the vehicle refrigerator 1. As an example, the first speed threshold may be set at a vehicle idling speed or 5 km/h, and the second speed threshold may be set at 40 km/h.

When the vehicle is not started, a first determination of the in-vehicle occupant status is made to check whether there is a person in the vehicle. When there is a person in the vehicle, the vehicle refrigerator 1 is controlled to operate in a silent and low power mode. When there is no person in the vehicle, the vehicle refrigerator 1 is further controlled to operate based on the vehicle battery charge level.

It should be noted that the method for obtaining the in-vehicle occupant status is not limited in the disclosure. As an example, an apparatus such as a camera connected to the VCU of the electric vehicle 2, an infrared human body sensor, and a millimeter-wave radar sensor in the vehicle can be used to detect whether there is a person in the vehicle. Those skilled in the art can also select other technical solutions to implement the detection of the in-vehicle occupant status according to actual conditions.

In this embodiment, the vehicle refrigerator 1 is connected to a traction battery of the electric vehicle 2 through a power interface of the connector 16, and is supplied with electric energy by the traction battery, and the vehicle battery charge level is obtained through a battery management system (BMS) of the traction battery. When the vehicle battery charge level is greater than a first charge level threshold, it indicates that the battery of the electric vehicle 2 is fully charged and can provide sufficient power for the vehicle refrigerator 1 for refrigeration. In this case, the refrigerating effect of the vehicle refrigerator 1 is given top priority, and the vehicle refrigerator 1 can be controlled to operate in a fourth refrigerating capacity mode.

When the vehicle battery charge level is less than or equal to the first charge level threshold, the vehicle battery charge level drops. In this case, in order to prolong the running time of the vehicle refrigerator 1, the vehicle refrigerator 1 is controlled to operate in a silent and low power mode.

In addition, in order to prevent the vehicle battery from being over-discharged and avoid the occurrence of a situation in which the normal operation of other devices in the vehicle is affected due to an excessively low battery charge level, a second charge level threshold can be set, where the second charge level threshold is less than the first charge level threshold. As an example, the first charge level threshold can be set to be 60% of the capacity of the traction battery of the electric vehicle 2, and the second charge level threshold can be set to be 30% of the capacity of the traction battery of the electric vehicle 2.

When the vehicle battery charge level further drops and is less than the second charge level threshold, the VCU of the electric vehicle 2 can send a reminder message to the user through the cloud server 3, and can send one or more combinations of the following messages according to the user setting. The reminder message includes: a reminder of the remaining battery charge level of the vehicle, a reminder to take out an item stored in the vehicle refrigerator, a reminder of an estimated showdown time of the vehicle refrigerator, etc.

Moreover, the user can set whether the vehicle refrigerator 1 will be shut down immediately or after a preset period of time according to actual conditions. The preset period of time can be set based on the capacity of the traction battery of the electric vehicle 2, the second charge level threshold, and the power consumption of the vehicle refrigerator 1.

It should be noted that, among several operating modes of the vehicle refrigerator 1, the silent and low power mode has the minimum refrigerating capacity, and also has the minimum amount of noise and vibration generated. As an example, in the silent and low power mode, the vehicle refrigerator 1 can be set to operate intermittently at a low power. For example, vehicle refrigerator 1 is set to operate at 10% of the full-load refrigerating capacity for 10 minutes every 2 hours, and the running noise level of the vehicle refrigerator 1 in this case is usually not higher than 32 dB.

The refrigerating capacity of the first refrigerating capacity mode is less than the refrigerating capacity of the second refrigerating capacity mode, the refrigerating capacity of the second refrigerating capacity mode is less than the refrigerating capacity of the third refrigerating capacity mod, and the refrigerating capacity of the fourth refrigerating capacity mode is higher than those of the silent and low power mode and the first refrigerating capacity mode, usually for the purpose of fast refrigerating. The respective refrigerating capacities of the silent and low power mode, the first refrigerating capacity mode, the second refrigerating capacity mode, and the third refrigerating capacity mode can be set according to actual conditions of the electric vehicle 2.

It should be noted that, during the process of controlling the operation of the vehicle refrigerator 1 based on the vehicle state information shown in FIG. 8, the comparison between the real-time temperature of the vehicle refrigerator 1 and the target temperature thereof is carried out at all times, provided that the real-time temperature is not higher than the target temperature, that is, controlling the vehicle refrigerator 1 to enter the silent and low power mode. When the real-time temperature is higher than the target temperature, the operation of the vehicle refrigerator 1 is controlled based on current vehicle state information.

It should be noted that the method for obtaining the respective refrigerating capacity of the vehicle refrigerator 1 based on real-time temperature, the target temperature and the vehicle state information can be implemented either in the cloud server 3 or in the VCU of the electric vehicle 2. Without departing from the principle of the disclosure, the technical solutions after changing data processing positions shall all fall within the scope of protection of the disclosure.

It should be noted that the control of refrigerating components (such as a compressor and a fan) of the vehicle refrigerator 1 based on the refrigerating capacity is usually carried out by the control module (the main processor) of the vehicle refrigerator 1. The method for controlling the refrigerating components of the vehicle refrigerator 1 based on the refrigerating capacity is a well-known technology in the art, which can be implemented by those skilled in the art by referring to relevant technical documents, and is thus not repeated here.

Further, the disclosure also provides a storage medium. The storage medium may be configured to store a program for performing the vehicle refrigerator control method in the foregoing method embodiments, where the program may be loaded and run by a processor to implement the foregoing vehicle refrigerator control method. For ease of description, only parts related to the embodiments of the disclosure are shown. For specific technical details that are not disclosed, reference may be made to the method part of the embodiments of the disclosure. The storage medium may be a storage device formed by various electronic devices. Optionally, the storage medium in the embodiments of the disclosure is a non-transitory readable-writable storage medium.

Further, the disclosure also provides a vehicle including a vehicle body, a processor, and a memory. Optionally, the vehicle body may be an electric vehicle; the electric vehicle is equipped with a vehicle refrigerator; the processor and the memory are installed on the vehicle body; and the memory may be configured to store a program for performing the vehicle refrigerator control method in the foregoing method embodiments, where the program may be loaded and run by the processor to implement the foregoing vehicle refrigerator control method. For ease of description, only parts related to the embodiments of the disclosure are shown. For specific technical details that are not disclosed, reference may be made to the method part of the embodiments of the disclosure. The memory may be a storage device formed by various electronic devices. Optionally, the memory in the embodiments of the disclosure is a non-transitory readable storage medium.

Those skilled in the art should be able to realize that the method steps of the various examples described in conjunction with the embodiments disclosed herein can be implemented in electronic hardware, computer software or a combination of both. To clearly illustrate the interchangeability of electronic hardware and software, the compositions and steps of the various examples have been generally described in terms of functionality in the above description. Whether these functions are performed in electronic hardware or software depends on the specific application and design constraints of the technical solution. Those skilled in the art can implement the described functions by using different methods for each particular application, but such implementation should not be considered as going beyond the scope of the disclosure.

It should be noted that in the description of the disclosure, the term "A and/or B" indicates all possible combinations of A and B, for example, only A, only B, or A and B.

It should be noted that the terms "first", "second", "third", "fourth", and other ordinal numbers in the description, claims, and drawings of the disclosure are only intended to distinguish between similar objects, not to describe or indicate a particular order or sequence. It should be understood that the data termed in such a way are interchangeable in proper circumstances so that the embodiments of the disclosure described herein can be implemented in other orders than the order illustrated or described herein.

Heretofore, the technical solutions of the disclosure have been described with reference to the preferred embodiments shown in the accompanying drawings. However, those skilled in the art can readily understand that the scope of protection of the disclosure is apparently not limited to these specific embodiments. Those skilled in the art can make equivalent changes or substitutions to the related technical features without departing from the principle of the disclosure, and all the technical solutions with such changes or substitutions shall fall within the scope of protection of the disclosure.

The invention claimed is:

1. A vehicle refrigerator control method, comprising:
   obtaining a real-time temperature and a target temperature of a vehicle refrigerator;
   obtaining vehicle state information, the vehicle state information comprising at least one of a vehicle energy-saving setting, a vehicle start state, a vehicle traveling state, an in-vehicle occupant status, and a vehicle battery charge level;
   comparing the real-time temperature and the target temperature, controlling the vehicle refrigerator based on the vehicle state information when the real-time temperature is greater than the target temperature;
   wherein controlling the vehicle refrigerator based on the vehicle state information when the real-time temperature is greater than the target temperature comprises:
   determining whether the vehicle energy-saving setting is a vehicle energy-saving mode;
   if the vehicle energy-saving setting is not a vehicle energy-saving mode, controlling the operation of the vehicle refrigerator based on at least one of the vehicle start state, the vehicle traveling state, the in-vehicle occupant status, and the vehicle battery charge level;
   wherein controlling the operation of the vehicle refrigerator based on at least one of the vehicle start state, the vehicle traveling state, the in-vehicle occupant status, and the vehicle battery charge level comprises:
   controlling the operation of the vehicle refrigerator based on the vehicle traveling state when the vehicle start state indicates started; and
   controlling the operation of the vehicle refrigerator based on at least one of the in-vehicle occupant status and the vehicle battery charge level when the vehicle start state indicates unstarted.

2. The vehicle refrigerator control method according to claim 1, wherein the method further comprises:
   controlling the vehicle refrigerator to operate in a silent and low power mode when the real-time temperature is less than or equal to the target temperature.

3. The vehicle refrigerator control method according to claim 1, wherein the method further comprises:
   if the vehicle energy-saving setting is a vehicle energy-saving mode, controlling the vehicle refrigerator to operate in the silent and low power mode.

4. The vehicle refrigerator control method according to claim 3, wherein the vehicle traveling state comprises at least a vehicle traveling speed, and the method for controlling the operation of the vehicle refrigerator based on the vehicle traveling state when the vehicle start state indicates started comprises:
   controlling the vehicle refrigerator to operate in a first refrigerating capacity mode when the vehicle traveling speed is less than a first speed threshold;
   controlling the vehicle refrigerator to operate in a second refrigerating capacity mode when the vehicle traveling speed is greater than or equal to the first speed threshold and less than a second speed threshold; and
   controlling the vehicle refrigerator to operate in a third refrigerating capacity mode when the vehicle traveling speed is greater than or equal to the second speed threshold,
   wherein refrigerating capacities respectively corresponding to the first refrigerating capacity mode, the second refrigerating capacity mode and the third refrigerating capacity mode increase sequentially.

5. The vehicle refrigerator control method according to claim 3, wherein the method for controlling the operation of the vehicle refrigerator based on at least one of the in-vehicle occupant status and the vehicle battery charge level when the vehicle start state indicates unstarted comprises:
   controlling the vehicle refrigerator to operate in the silent and low power mode when the in-vehicle occupant status indicates that there is a person; and
   controlling the operation of the vehicle refrigerator based on the vehicle battery charge level when the in-vehicle occupant status indicates that there is no person,
   wherein, the method for controlling the operation of the vehicle refrigerator based on the vehicle battery charge level comprises:
   controlling the vehicle refrigerator to operate in a fourth refrigerating capacity mode when the vehicle battery charge level is greater than a first charge level threshold;
   controlling the vehicle refrigerator to operate in the silent and low power mode when the vehicle battery charge level is less than or equal to the first charge level threshold; and
   controlling the vehicle refrigerator to stop operating after a preset period of time and/or to send a reminder message to a user when the vehicle battery charge level is less than a second charge level threshold, the reminder message comprising at least: a reminder to take out an item stored in the vehicle refrigerator and/or a reminder of an estimated showdown time of the vehicle refrigerator,
   wherein the first charge level threshold is greater than the second charge level threshold.

6. The vehicle refrigerator control method according to claim 1, wherein the vehicle refrigerator is at least provided with a first key and a second key, and the method for obtaining the target temperature of the vehicle refrigerator comprises:
   obtaining a preset target temperature;
   or, determining the target temperature based on item information of the item stored in the vehicle refrigerator, wherein the method for determining the target temperature based on item information of the item stored in the vehicle refrigerator comprises:

obtaining historical item information of the vehicle refrigerator;

detecting key states of the first key and the second key in real time;

updating real-time item information of the vehicle refrigerator based on the key states of the first key and/or the second key and the historical item information; and determining the target temperature based on the real-time item information.

7. The vehicle refrigerator control method according to claim 6, wherein the historical item information is stored in a cloud server, and the method for updating real-time item information of the vehicle refrigerator based on the key states of the first key and/or the second key and the historical item information comprises:

obtaining information of an added item based on the first key;

when the information of the added item is contained in the historical item information, obtaining the information of the added item from the cloud server; and when the information of the added item is not contained in the historical item information, obtaining the information of the added item through the Internet.

8. A non-transitory readable-writable storage medium adapted to store a plurality of program codes, wherein the program codes are adapted to be loaded and run by a processor to perform a vehicle refrigerator control method according to claim 1.

9. A vehicle, comprising a vehicle body, a processor, and a memory, wherein the memory is adapted to store a plurality of program codes, and the program codes are adapted to be loaded and run by the processor to perform a vehicle refrigerator control method according to claim 1.

\* \* \* \* \*